United States Patent
Stewart et al.

(10) Patent No.: US 9,203,663 B2
(45) Date of Patent: Dec. 1, 2015

(54) METHOD FOR SIGNALING A MODULATION SCHEME TO USER EQUIPMENT IN A COMMUNICATION SYSTEM

(75) Inventors: Kenneth A. Stewart, Grayslake, IL (US); Raja S. Bachu, Somerset, NJ (US); Jianzhong Zhang, Irving, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 2392 days.

(21) Appl. No.: 12/024,159

(22) Filed: Feb. 1, 2008

(65) Prior Publication Data

US 2009/0196260 A1 Aug. 6, 2009

(51) Int. Cl.
*H04B 7/216* (2006.01)
*H04L 27/00* (2006.01)
*H04L 27/34* (2006.01)
*H04L 1/00* (2006.01)
*H04L 1/18* (2006.01)

(52) U.S. Cl.
CPC .......... *H04L 27/0008* (2013.01); *H04L 1/0025* (2013.01); *H04L 27/0012* (2013.01); *H04L 27/34* (2013.01); *H04L 1/0003* (2013.01); *H04L 1/0072* (2013.01); *H04L 1/1819* (2013.01)

(58) Field of Classification Search
USPC ........................................................ 370/204
See application file for complete search history.

(56) References Cited

U.S. PATENT DOCUMENTS

| | | | |
|---|---|---|---|
| 7,715,430 B2 * | 5/2010 | Ranta-Aho et al. | 370/465 |
| 2007/0150787 A1 * | 6/2007 | Kim et al. | 714/748 |
| 2008/0117873 A1 * | 5/2008 | Ranta-Aho et al. | 370/329 |

OTHER PUBLICATIONS

3GPP TS 25.212 v7.3.0 (Dec. 2006), 3rd Generation Partnership Project; Technical Specification Group Radio Access Network; Multiplexing and channel coding (FDD) (Release 7), pp. 1-84.

* cited by examiner

*Primary Examiner* — Andrew Chriss
(74) *Attorney, Agent, or Firm* — Faegre Baker Daniels LLP

(57) ABSTRACT

A method signals a modulation scheme to user equipment on a control channel in a communication system. The method includes encoding the modulation scheme on a modulation specifier and encoding a number of channelization codes on a code group indicator. When the modulation scheme is other than quadrature phase shift keying with the user equipment being configured to support 64-quadrature amplitude modulation (64-QAM), then set the modulation specifier to indicate that the applied modulation scheme is other than QPSK, encode a code offset on a code offset indicator, and set one bit of the code offset indicator to indicate that the applied modulation scheme is 64-QAM. Finally, the method includes transmitting the modulation specifier, the code group indicator, and the code offset indicator on the control channel to the user equipment.

19 Claims, 7 Drawing Sheets

FIG. 6

EVEN NUMBERED CONTROL CHANNEL INDEX: CCS VALUES (P,O) ARE SHADED

FIG. 7

Table 700:

- 705: CODE GROUP INDIC. (3 BITS)
- 710: CODE OFFSET INDICATOR (4 BITS) — LSB INDICATED BY HS-SCCH NUMBER
- 715: NO. OF CODES (P)
- 720: CODE-TREE OFFSET (O)

ODD NUMBERED CONTROL CHANNEL INDEX: CCS VALUES (P,O) ARE SHADED

| Code Group | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | P | 1 | 1 | 1 | 1 | 1 | 1 | 1 | 1 | 1 | 1 | 1 | 1 | 1 | 1 | 1 | 1 |
|   | O | 1 | 1 | 1 | 1 | 1 | 1 | 1 | 1 | 1 | 1 | 1 | 1 | 1 | 1 | 1 | 15 |
| 1 | P | 1 | 2 | 2 | 2 | 2 | 2 | 2 | 2 | 2 | 2 | 2 | 2 | 2 | 2 | 15 | 1 |
|   | O | 1 | 3 | 3 | 4 | 5 | 6 | 7 | 8 | 9 | 10 | 11 | 12 | 13 | 14 | 15 | 14 |
| 2 | P | 2 | 2 | 2 | 3 | 2 | 3 | 2 | 3 | 2 | 3 | 2 | 3 | 2 | 3 | 2 | 1 |
|   | O | 3 | 2 | 3 | 4 | 3 | 6 | 3 | 8 | 3 | 10 | 3 | 12 | 3 | 14 | 14 | 13 |
| 3 | P | 1 | 3 | 3 | 3 | 3 | 3 | 3 | 3 | 3 | 3 | 3 | 3 | 3 | 13 | 2 | 1 |
|   | O | 3 | 2 | 3 | 4 | 3 | 6 | 3 | 8 | 3 | 10 | 3 | 12 | 13 | 14 | 2 | 13 |
| 4 | P | 4 | 4 | 4 | 4 | 4 | 4 | 4 | 4 | 4 | 4 | 4 | 4 | 12 | 3 | 12 | 1 |
|   | O | 1 | 3 | 4 | 5 | 4 | 6 | 4 | 8 | 4 | 10 | 4 | 12 | 4 | 3 | 2 | 12 |
| 5 | P | 1 | 5 | 5 | 5 | 5 | 5 | 5 | 5 | 5 | 5 | 5 | 11 | 4 | 11 | 2 | 1 |
|   | O | 5 | 3 | 5 | 4 | 5 | 6 | 5 | 8 | 5 | 10 | 5 | 5 | 11 | 3 | 11 | 11 |
| 6 | P | 6 | 6 | 6 | 6 | 6 | 6 | 6 | 6 | 6 | 6 | 10 | 5 | 10 | 3 | 10 | 1 |
|   | O | 1 | 3 | 5 | 5 | 6 | 7 | 6 | 9 | 6 | 10 | 6 | 10 | 4 | 10 | 2 | 10 |
| 7 | P | 1 | 7 | 7 | 7 | 7 | 7 | 7 | 7 | 7 | 9 | 5 | 9 | 4 | 9 | 2 | 1 |
|   | O | 7 | 3 | 7 | 5 | 7 | 6 | 7 | 8 | 7 | 7 | 9 | 9 | 9 | 3 | 9 | 9 |

METHOD FOR SIGNALING A MODULATION SCHEME TO USER EQUIPMENT IN A COMMUNICATION SYSTEM

FIELD OF THE DISCLOSURE

The present disclosure relates generally to communication systems and more particularly to signaling a modulation scheme to user equipment in a communication system.

BACKGROUND

Data services are expected to have significant growth over the next few years and will likely become the dominant source of third generation (3G) traffic and revenue. In order to meet the increasing demand for high data-rate multimedia services, the $3^{rd}$ Generation Partnership Project (3GPP) has released, and continues to evolve, a new high-speed data transfer feature named High-Speed Downlink Packet Access (HSDPA). High Speed Downlink Packet Access (HSDPA) is one of the key features of the third generation wireless communication standard for Wide Band Code Division Multiple Access (W-CDMA). W-CDMA is proposed to support multimedia services in the downlink direction. HSDPA brings high speed data delivery to 3G terminals to help users receive effective multimedia capabilities that benefit from data rates previously unavailable due to limitations in the radio access network between the user terminal and the base station. In order to achieve this high speed data delivery, several key technologies, such as Adaptive Modulation and Coding (AMC) and Hybrid-ARQ (Automatic Repeat Request) have been considered and adopted in the relevant telecommunication standards. Furthermore, fast signaling techniques have also been used for HSDPA to enhance the AMC link adaptation technique. In HSDPA communication systems, fast signaling is applied using High Speed Shared Control Channels (HS-SCCH) which carry control information to terminals for receiving and decoding associated data channels (High Speed Downlink Shared Channel—HS-DSCH) which commences transmission two slots after the start of transmission of the control channel.

In order to reduce the number of information bits transmitted, certain types of information are encoded with only indicator information being sent to user equipment. This information includes channelization codes associated with the data channels, transport block size, redundancy version parameters, the new data indicator parameter, and modulation scheme. This encoded information is sent on the shared control channel (HS-SCCH) which is always two slots in advance of the associated data channel (HS-DSCH).

The HS-SCCH had been designed to carry a single bit modulation scheme indicator or 'modulation specifier'. This single bit modulation scheme indicator supports either quadrature phase shift keying (QPSK) or 16-quadrature amplitude modulation scheme (16-QAM) selection. However, with the present design of HS-SCCH it is not possible to signal higher schemes of modulation (like 64-QAM) to the user equipment.

Accordingly, there is a need for a method for signaling higher schemes of modulation (like 64-QAM) to the user equipment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 is a schematic of a look-up table representing channelization code set values for an even numbered control channel index in accordance with some embodiments.

FIG. 7 is a schematic of a look-up table representing channelization code set values for an odd numbered control channel index in accordance with some embodiments.

Figure 1:
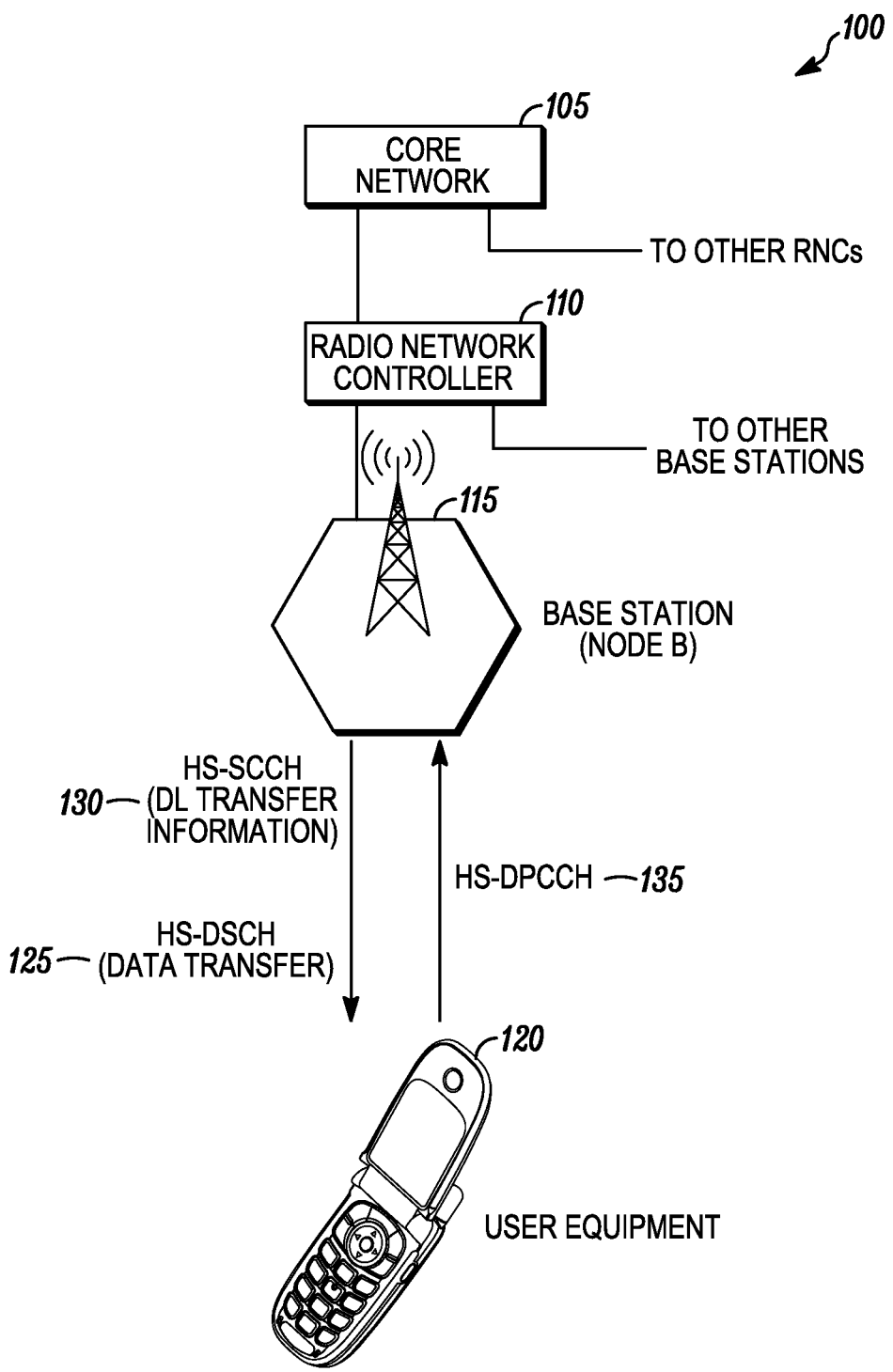
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a method for a base station to signal a modulation scheme to user equipment on a control channel in a communication system. The control channel carries a modulation specifier and channelization code set information with a code group indicator and a code offset indicator. The modulation specifier is encoded based on the modulation scheme, and the code group indicator is encoded based on a number of channelization codes (P). When the modulation scheme is other than quadrature phase shift keying (QPSK) and when the user equipment is configured to support 64-quadrature amplitude modulation (64-QAM), then the base station sets the modulation specifier to indicate that the applied modulation scheme is other than QPSK and further encodes a code offset (O) on the code offset indicator. Next, the base station sets one bit of the code offset indicator to indicate that the applied modulation scheme is 64-QAM. Finally the modulation specifier, the code group indicator, and the code offset indicator are transmitted on the control channel to the user equipment. The user equipment decodes the signaled modulation scheme based on the modulation specifier, code group indicator, and code offset indicator received on the control channel from the base station. Use of this method in an HSDPA communication system enables High Speed Shared Control Channels (HS-SCCH) to indicate modulation schemes in addition to QPSK and 16-QAM without increasing the payload of the HS-SCCH.

FIG. 1 is a block diagram illustrating a sample communication system employing a method in accordance with some embodiments. Specifically, FIG. 1 illustrates a high speed downlink packet access (HSDPA) communication system 100. The HSDPA communication system 100 has a core network (CN) 105 including one or more radio network controllers (RNCs), e.g., RNC 110. The core network 105 is the centralized part of the HSDPA communication system 100 which provides mobility management, session management, and transport for Internet Protocol packet services and controls the functionality of the RNCs. Each RNC controls a plurality of base stations (also referred to as Node Bs). For example, the RNC 110 controls the base station 115. A radio network controller 110 controls the radio transmitters and receivers in the base stations, and it performs other radio access and link maintenance functions in the HSDPA communication system 100. Each base station (e.g., base station 115) may serve a number of user equipment, e.g. user equipment 120. In one example, the base station 115 is responsible for transmission and retransmission of data to the user equipment 120.

The base station 115 uses data channels such as a high speed downlink shared channel (HS-DSCH) 125 to transmit data to the user equipment 120. Before transmitting the data on the HS-DSCH 125 to the user equipment 120, the base station 115 first transmits data transfer information to the user equipment 120 via a control channel such as high speed shared control channel (HS-SCCH) 130. When the user equipment 120 detects a control channel (e.g. the HS-SCCH 130), with activity intended for it, the user equipment 120 proceeds to decode and retrieve the data transfer information sent by the base station 115 on the HS-SCCH 130. The retrieved data transfer information facilitates the user equipment 120 to receive and decode the downlink data transferred on the associated HS-DSCH 125. After receiving and decoding the downlink data transferred on the HS-DSCH 125, the user equipment 120 sends an acknowledgement to the base station 115 on a dedicated control channel such as a high speed dedicated physical control channel (HS-DPCCH) 135.

Figure 2:
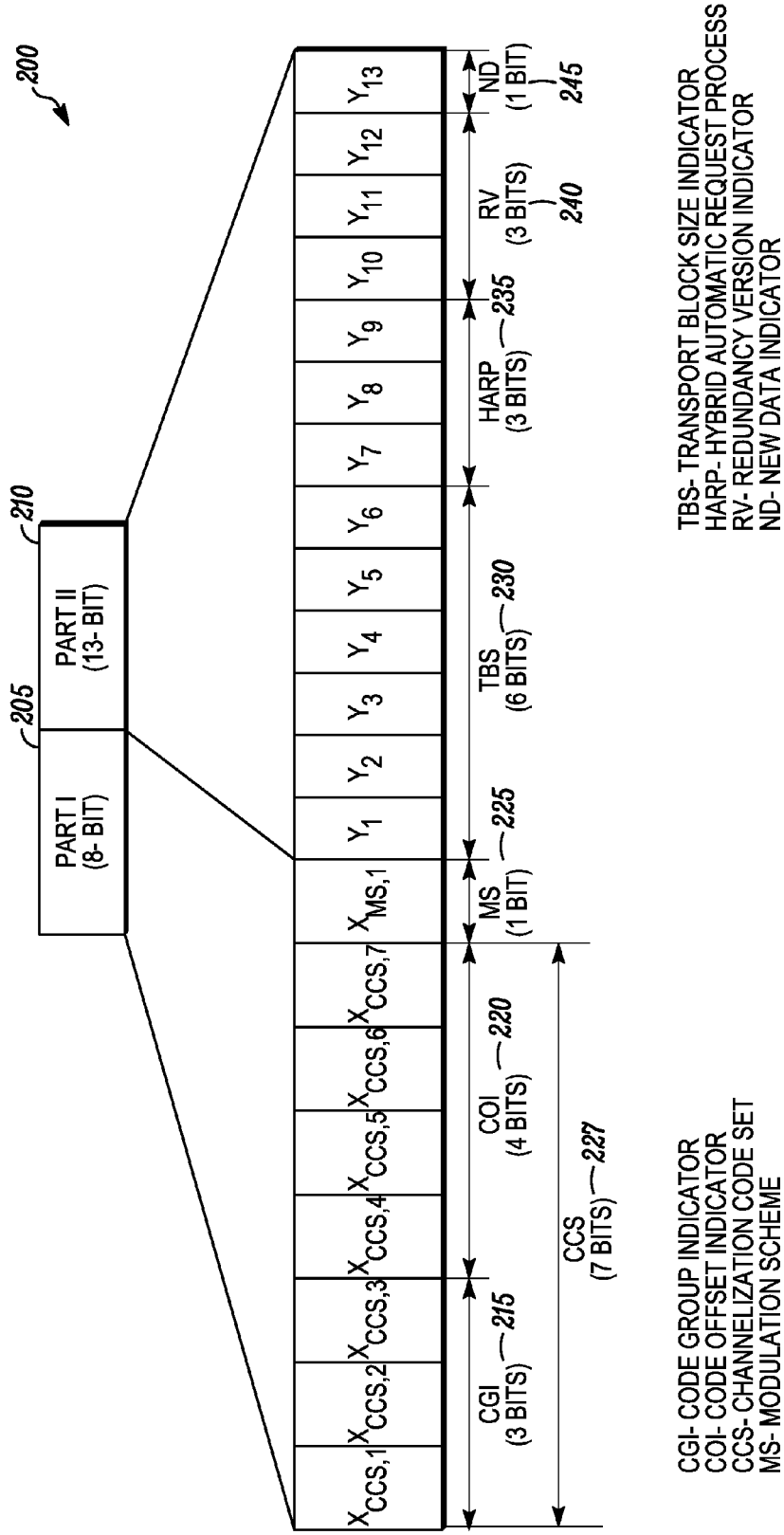
FIG. 2 is a schematic of frame structure for a HS-SCCH channel in accordance with some embodiments.

FIG. 2 is a schematic of a frame structure 200 for HS-SCCH 130 in accordance with some embodiments of the present invention. The frame structure 200 of the HS-SCCH 130 is divided into two parts, namely part-I structure 205 and part-II structure 210. The part-I structure 205 of the HS-SCCH 130 carries 8 bits of information ($x_{ccs,1}$, $x_{ccs,2}$, $x_{ccs,3}$, $x_{ccs,4}$, $x_{ccs,5}$, $x_{ccs,6}$, $x_{ccs,7}$, $x_{ms,1}$). The first seven bits ($x_{ccs,1}$, $x_{ccs,2}$, $x_{ccs,3}$, $x_{ccs,4}$, $x_{ccs,5}$, $x_{ccs,6}$, $x_{ccs,7}$) of the part-I structure 205 of the HS-SCCH 130 represents a channelization code set (CCS) 227 which includes information related to channelization codes used by the base station 115. The first three bits ($x_{ccs,1}$, $x_{ccs,2}$, $x_{ccs,3}$) of the channelization code set represents a code group indicator (CGI) 215 including information related to a number of channelization codes (P) used by the base station 115. The next four bits ($x_{ccs,4}$, $x_{ccs,5}$, $x_{ccs,6}$, $x_{ccs,7}$) of the channelization code set represents a code offset indicator (COI) 220 including information related to a code offset (O) of the channelization codes.

The last bit ($x_{ms,1}$) of the part-I structure 205 represents a modulation specifier 225. The modulation specifier 225 specifies the modulation scheme used by the base station 115 for downlink transmission. The modulation scheme includes, but is not limited to, Quadrature Phase Shift Keying (QPSK), 16-Quadrature Amplitude Modulation (16-QAM), 64-Quadrature Amplitude Modulation (64-QAM), and other higher modulation schemes.

The part-II structure 210 of the HS-SCCH 130 carries 13 bits of information ($y_1$, $y_2$, $y_3$, $y_4$ ... $y_3$). The first 6 bits ($y_1$, $y_2$, $y_3$, $y_4$, $y_5$, $y_6$) of the part-II structure 210 represents a transport block size (TBS) indicator 230 including block size information of the HS-DSCH 125. The next 3 bits ($y_7$, $y_8$, $y_9$) represents a hybrid automatic repeat request process (HARP) indicator 235 including information related to a number of hybrid automatic repeat request process cycles operated by the base station 115. The next three bits ($y_{10}$, $y_{11}$, $y_{12}$), represent a redundancy version (RV) indicator 240 which includes information about redundancy version and constellation version used at the base station 115. The last bit ($y_{13}$) represents a new data (ND) indicator 245, wherein the new data indicator 245 changes from zero to one or one to zero for each new hybrid automatic repeat request process cycle operated by the base station 115.

Figure 3:
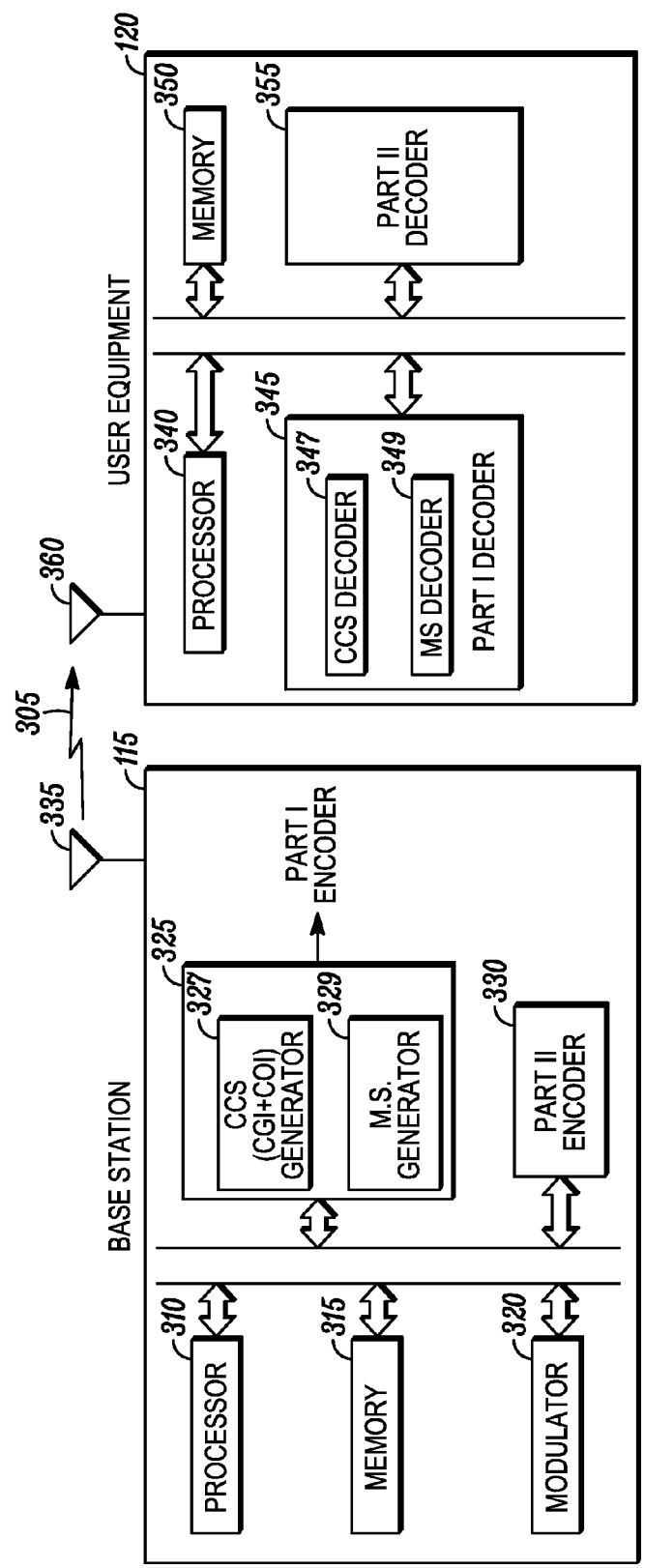
FIG. 3 is a block diagram of user equipment in communication with a base station in accordance with some embodiments.

FIG. 3 is a block diagram of the user equipment 120 in communication with the base station 115 in accordance with some embodiments of the present invention. The user equipment 120 and the base station 115 are in communication with each other through a radio link 305. The user equipment 120 may be any type of wireless communication device including, but not limited to, cellular, mobile, and wireless telephones; PCs (personal computers), laptop, notebook, and wearable computers with wireless modems, PDAs (personal digital assistants) with wireless modems; and pagers. For example, the user equipment 120 may include digital systems to secure fast wireless transmissions of voice and/or data.

The base station 115 may be any wireless communication station installed as part of the HSDPA communication system 100. The base station is also referred to as radio base station or Node B (in 3G networks), an access point base station, or an infrastructure device.

The base station 115 includes a processor 310, a memory 315, a modulator 320, a part-I encoder 325 including a channelization code set (CCS) generator 327 and a modulation specifier (MS) generator 329, a part-II encoder 330, and an antenna 335. The user equipment 120 includes a processor 340, a memory 350, a part-I decoder 345 including a channelization code set decoder 347 and a modulation specifier decoder 349, a part-II decoder 355 and an antenna 360. The user equipment 120 or the base station 115 is an integrated unit containing at least all the elements depicted in FIG. 3, as well as any other elements necessary for the user equipment 120 or the base station 115 to perform its particular electronic function. Alternatively, the user equipment 120 or the base station 115 can be a collection of appropriately interconnected units or devices, wherein such units or devices perform functions that are equivalent to the functions performed by the elements of the user equipment 120 or the base station 115.

The base station 115 stores the channelization codes and the modulation scheme, used by the modulator 320 to modulate the data for the downlink transmission, in the memory 315. In this specific implementation, the channelization codes and the modulation scheme used by the base station 115 are based on channel quality information received from the user equipment 120, wherein the channel quality information includes a measurement of the channel quality. In further determining the channelization code and modulation scheme to be used in the base station 115 to user equipment 120 transmission, the base station 115 further takes into account the "user equipment capability" signalling information previously provided by the user equipment 120, where the function of this information in the present instance is to describe to the base station 115 the demodulation capability of the user equipment 120, including the maximum number of supported channelisation codes and modulation schemes. The part-I encoder encodes the part-I information. The channelization code set generator 327 of the part-I encoder 325 encodes the number of channelization codes (P) stored in the memory 315 onto the code group indicator 215 ($x_{ccs,1}, x_{ccs,2}, x_{ccs,3}$) of the HS-SCCH 130. The channelization code set generator 327 also encodes the code offset (O) stored in the memory 315 onto the code offset indicator 220 ($x_{ccs,4}, x_{ccs,5}, x_{ccs,6}, x_{ccs,7}$) of the HS-SCCH 130. The modulation specifier generator 329 of the part-I encoder 325 encodes the modulation scheme stored in the memory 315 on the modulation specifier 225 ($x_{ms,1}$) of the HS-SCCH 130. The part-I information, thus encoded by the part-I encoder 325 includes the code group indicator 215, the code offset indicator 220, and the modulation specifier 225.

The part-II encoder 330 encodes the part-II information related to transport block size, the number of HARQ process cycles, the redundancy version, and the change of hybrid automatic repeat request process cycle on the part II of the HS-SCCH 130. The encoded information (both part-I and part-II information) is then transmitted on the HS-SCCH 130 to the user equipment 120 via antennas 335, 360 and the radio link 305.

The user equipment 120 receives the encoded information on the HS-SCCH 130 and stores the received information in the memory 350. The part-I decoder 345 decodes the part-I information. Specifically, the channelization code set (CCS) decoder 347 of the part-I decoder 345 decodes the channelization code set information stored in the memory 350 to obtain the number (P) and the offset (O) of the channelization codes used by the base station 115 for the downlink transmission to the user equipment 120. The modulation specifier (MS) decoder 349 of the part-I decoder 345 decodes the modulation specifier 225 ($x_{ms,1}$) stored in the memory 350 to decode the modulation scheme used by the base station 115 for the downlink transmission to the user equipment 120. The part-II decoder 355 decodes the part-II information of the HS-SCCH 130 stored in the memory 350 to obtain the information encoded in the part-II of the HS-SCCH 130.

The processors 310, 340 include one or more microprocessors, microcontrollers, DSPs (digital signal processors), state machines, logic circuitry, or any other device or devices that process information based on operational or programming instructions. Such operational or programming instructions are stored in the memory 315, 350. The memory 315, 350 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 310, 340 has one or more of its functions performed by a state machine or logic circuitry, the memory 315, 350 containing the corresponding operational instructions can be embedded within the state machine or logic circuitry. The operations performed by the processor 310, 340 and the other elements of the user equipment 120 and the base station 115 are described in detail below.

The antennas 335, 360 may use any known or developed structure for radiating and receiving electromagnetic energy in the frequency range containing the wireless carrier frequencies. Even though only one antenna 335, 360 is shown for each device, any number of antennas may interface with the base station 115 and the user equipment 120. Thus, the depiction of one antenna 335, 360 is not meant to be a limitation on an embodiment of the present invention.

Figure 4:
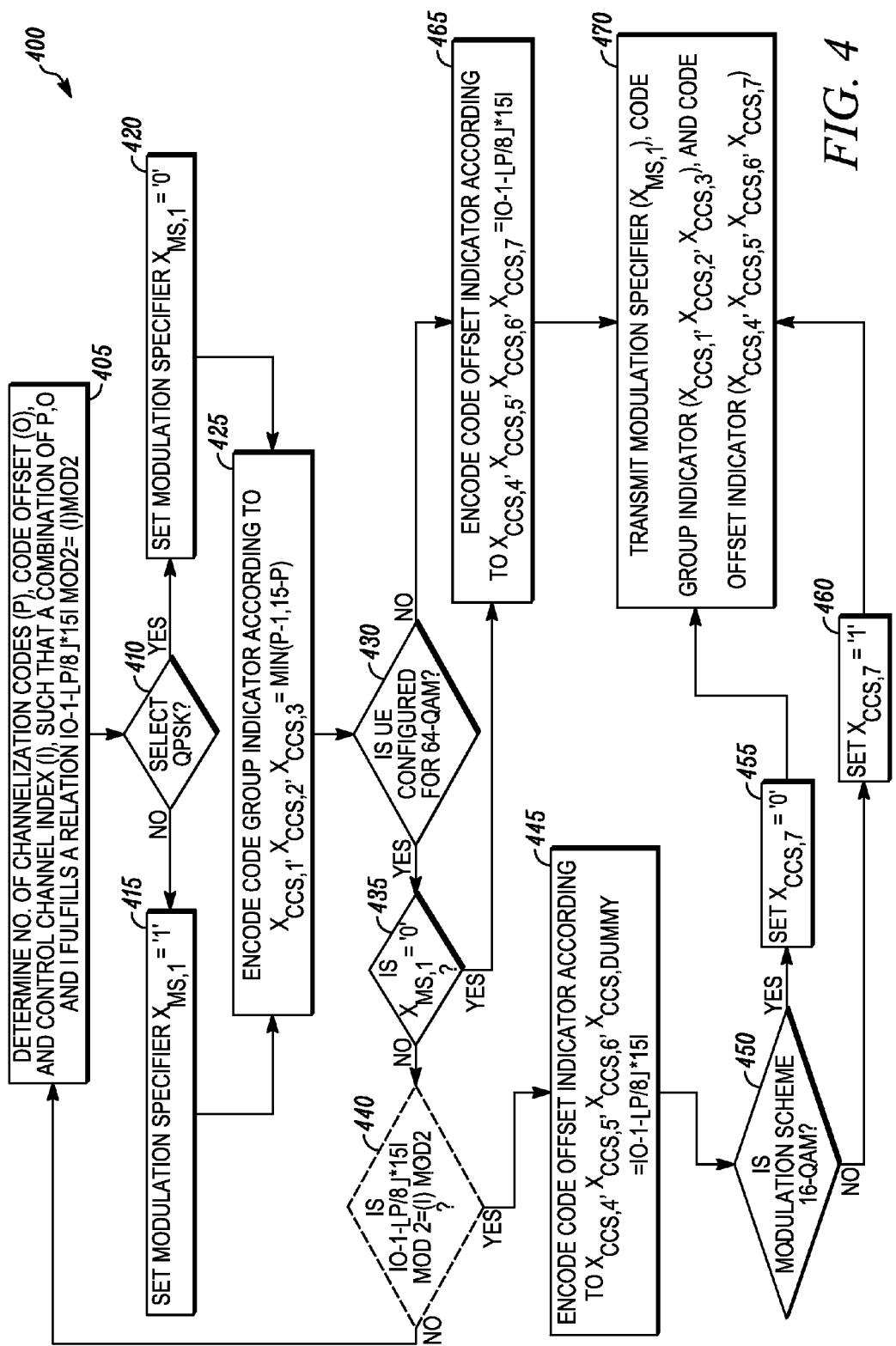
FIG. 4 is a flowchart of a method for a base station to signal a modulation scheme to user equipment in accordance with some embodiments.

FIG. 4 is a flowchart 400 of a method for a base station 115 to signal a modulation scheme to user equipment 120 in accordance with some embodiments. The flowchart 400 begins at step 405, where the base station 115 determines a number of channelization codes (P), a code offset (O), and a HS-SCCH number (I) to be used for downlink communication with a user equipment 120. In one example, as shown in step 405, the base station determines P, O, and I such that a combination of P, O, and I fulfills a relation $|O-1-\lfloor P/8 \rfloor *15| \bmod 2 = (I) \bmod 2$.

At step 410, the base station 115 determines whether to select a QPSK modulation scheme for downlink communication. If the base station 115 selects a modulation scheme other than QPSK, then at step 415 the base station 115 sets the modulation specifier 225 bit ($x_{ms,1}$) of the HS-SCCH 130 to indicate that the selected modulation scheme is other than QPSK. In one embodiment, as shown in step 415, the base station 115 sets the modulation specifier 225 to '1' to indicate that the selected modulation scheme is other than QPSK. In another embodiment, the base station 115 may set the modulation specifier 225 to '0' to indicate that the selected modulation scheme is other than QPSK.

On the other hand, if the base station selects QPSK as the downlink modulation scheme, then at step 420, the base station sets the modulation specifier 225 ($x_{ms,1}$) bit of the HS-SCCH 130 to indicate that the selected modulation scheme is QPSK. In one embodiment, as shown in step 420, the base station 115 sets the modulation specifier 225 to '0' to indicate that the selected modulation scheme is QPSK. In another embodiment, the base station 115 may set the modulation specifier 225 to '1' to indicate that the selected modulation scheme is QPSK.

Next at step 425, the base station 115 encodes the number of channelization codes (P) (as determined by the base station 115 at step 405) on the 3 bits ($x_{ccs,1}, x_{ccs,2}, x_{ccs,3}$) of the code group indicator 215 (CGI). In an example, the number of channelization codes (P) is encoded on the code group indicator 215 (CGI) using an unsigned binary representation of integers calculated by an expression according to $x_{ccs,1}, x_{ccs,2}, x_{ccs,3} = \min(P-1, 15-P)$, where $x_{cc,1}$ is a most significant bit of the code group indicator 215 (CGI).

Then, at step 430, the base station 115 determines whether the user equipment 120 is configured for 64-QAM. In one embodiment, the base station 115 will have previously determined the 64-QAM reception capability of the user equipment 120 based on previously signaled information from the user equipment 120 to the base station 115 concerning user equipment capability, and will have configured such user equipment 120 to be able to receive 64-QAM transmissions if desired. If the user equipment 120 is configured for 64-QAM, then the base station 115 determines whether the modulation specifier ($x_{ms,1}$) 225 is set to indicate that the selected modulation is QPSK. In one embodiment, as shown in step 435, the base station 115 determines whether the modulation specifier ($x_{ms,1}$) 225 is set to '0'. When the modulation specifier 225 ($x_{ms,1}$) is set to '0' or when the user equipment 120 is not configured for 64-QAM, then at step 465, the base station 115 encodes the code offset (O) on the 4 bits ($x_{ccs,4}, x_{ccs,5}, x_{ccs,6}, x_{ccs,7}$) of the code offset indicator 220 (COI). In an example, the code offset (O) may be encoded on the code offset indicator 220 (COI) using an unsigned binary representation of integers calculated by an expression according to $x_{ccs,4}, x_{ccs,5}, x_{ccs,6}, x_{ccs,7} = |O-1-\lfloor P/8 \rfloor *15|$, where $x_{ccs,4}$ is a most significant bit of the code offset indicator 220 (COI). Next at step 470, the base station 115 proceeds to transmit the modulation specifier 225 ($x_{ms,1}$), the code group indicator 215 ($x_{ccs,1}, x_{ccs,2}, x_{ccs,3}$), and the code offset indicator 220 ($x_{ccs,4}, x_{ccs,5}, x_{ccs,6}, x_{ccs,7}$) to the user equipment 120.

Referring back to the step 435, when the modulation specifier 225 ($x_{ms,1}$) is set to indicate other than QPSK, for example, when the modulation specifier is not set to '0' (or is set to '1'), then according to one example, as shown at step 440, the base station 115 optionally verifies whether the combination of the number of channelization codes (P) and the code offset (O) is valid for the HS-SCCH number (I) associated with the HS-SCCH 130. In one example, the verification is done by determining whether $|O-1-\lfloor P/8 \rfloor*15|$ mod 2 equals (I) mod 2. If $|O-1-\lfloor P/8 \rfloor*15|$mod 2 is not equal to (I) mod 2 (i.e., when the combination of the number of channelization codes (P) and the code offset (O) is not valid for the HS-SCCH number (I)) then the base station 115 reverts to the determination of the number of channelization codes (P), the code offset (O), and the HS-SCCH number (I) as shown in step 405. Of course if step 405 already specifies the relationship of P, O, and I, then step 440 is redundant. If step 405 does not pre-specify the relationship of P, O, and I, then step 440 is included. When $|O-1-\lfloor P/8 \rfloor*15|$ mod 2 equals (I) mod 2, then at step 445, the base station 115 encodes the code offset (O) on the first 3 bits ($x_{ccs,4}$, $x_{ccs,5}$, $x_{ccs,6}$) of the code offset indicator 220 (COI). In one example, the code offset (O) may be encoded on the code offset indicator 220 (COI) using an unsigned binary representation of integers calculated by an expression according to $x_{ccs,4}$, $x_{ccs,5}$, $x_{ccs,6}$, $x_{ccs,dummy}=|O-1-\lfloor P/8 \rfloor*15|$, where $X_{ccs,dummy}$ is a dummy bit that is not transmitted on the HS-SCCH 130.

Next at step 450, the base station 115 determines whether the modulation scheme used is 16-QAM. If the modulation scheme used is 16-QAM, then at step 455, the base station 115 sets the fourth bit ($x_{ccs,7}$) of the code offset indicator 220 (COI) to indicate that the selected modulation scheme is 16-QAM. In one example, the base station 115 sets the fourth bit ($x_{ccs,7}$) of the code offset indicator 220 (COI) to '0'. On the other hand, when the modulation scheme used is not 16-QAM (e.g., when the modulation scheme used is 64-QAM), then at step 460, the base station 115 sets the fourth bit ($x_{ccs,7}$) of the code offset indicator 220 (COI) to indicate that the selected modulation scheme is 64-QAM. In one example, as shown in step 460, the base station 115 sets the fourth bit ($x_{ccs,7}$) of the code offset indicator 220 (COI) to '1' to indicate that the selected modulation scheme is 64-QAM. After setting the fourth bit ($x_{ccs,7}$) of the code offset indicator based on whether the modulation scheme used is 16-QAM (determined at step 450 by the base station 115), the base station 115 proceeds to step 470 to transmit the modulation specifier 225 ($x_{ms,1}$), the code group indicator 215 (CGI) and the code offset indicator 220 (COI) to the user equipment 120.

Figure 5:
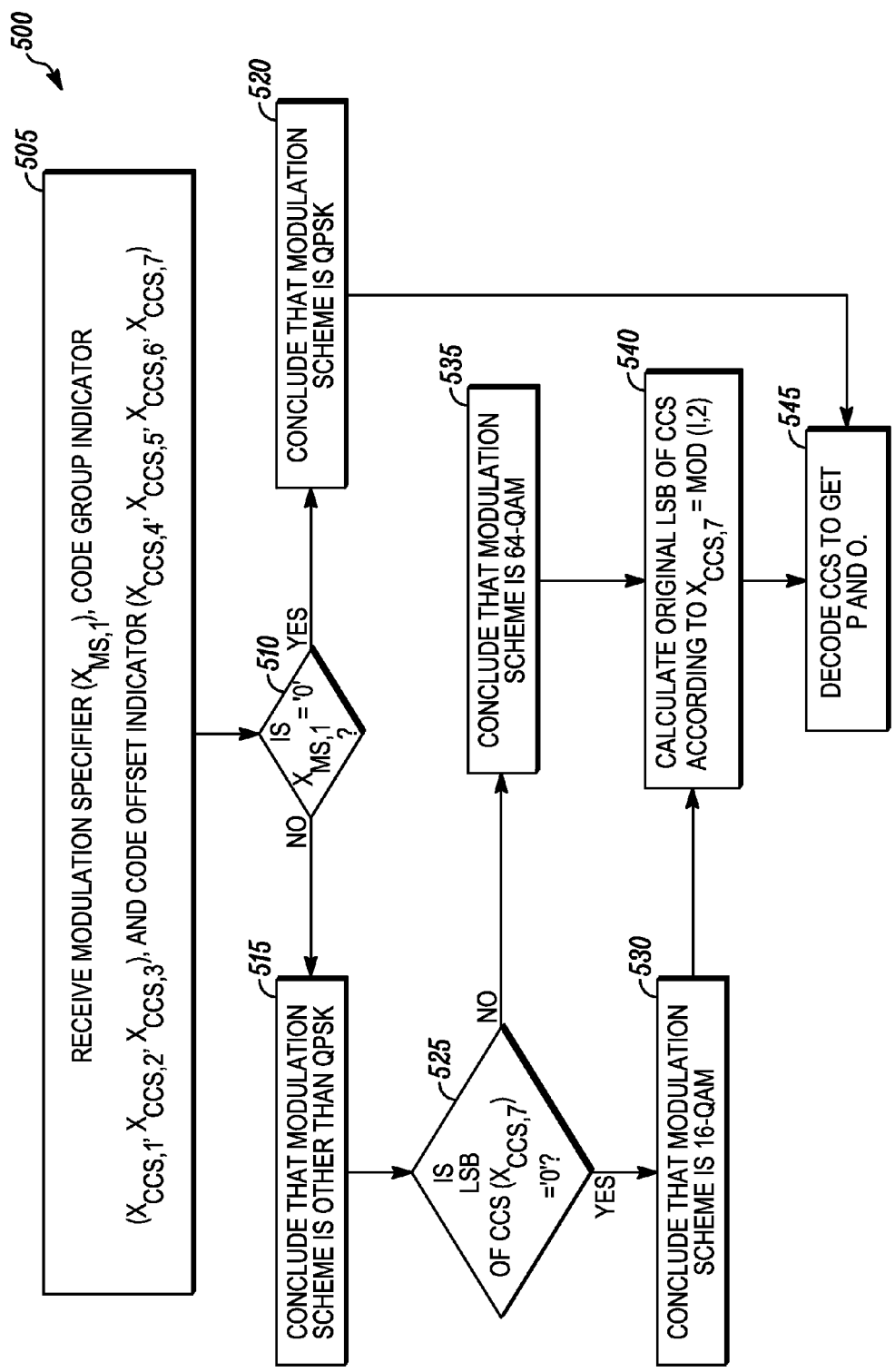
FIG. 5 is a flowchart of a method for a user equipment to decode a signaled modulation scheme in accordance with some embodiments.

FIG. 5 is a flowchart 500 of a method for a user equipment 120 to decode a signaled modulation scheme in accordance with some embodiments. The method begins at step 505, where the user equipment 120 receives the modulation specifier 225 ($x_{ms,1}$), the code group indicator 215 ($x_{ccs,1}$, $x_{ccs,2}$, $x_{ccs,3}$), and the code offset indicator 220 ($x_{ccs,4}$, $x_{ccs,5}$, $x_{ccs,6}$, $x_{ccs,7}$) transmitted by the base station 115 as described in step 470 of FIG. 4.

Next at step 510, the user equipment 120 examines the modulation specifier 225 ($x_{ms,1}$) to determine whether the modulation specifier 225 ($x_{ms,1}$) is '0'. When the modulation specifier 225 ($x_{ms,1}$) is '0', then at step 520, the user equipment 120 concludes that the modulation scheme is QPSK. Alternatively, in one example, the user equipment 120 may be configured to conclude that the modulation scheme is QPSK when the modulation specifier ($x_{ms,1}$) 225 is '1'.

Next at step 545, the user equipment 120 decodes the code group indicator 215 (CGI) and the code offset indicator 220 (COI) to get the number (P) of channelization codes and the code offset (O) of the channelization codes.

Referring back to the step 510, when the modulation specifier 225 ($x_{ms,1}$) is not '0', then at step 515, the user equipment 120 concludes that the modulation scheme is other than QPSK. Alternatively, in one example, the user equipment 120 may be configured to conclude that the modulation scheme is other than QPSK when the modulation specifier ($x_{ms,1}$) 225 is not '1'. Next at step 525, the user equipment 120 examines, for example, a least significant bit ($x_{ccs,7}$) of the code offset indicator (COI) 220 to determine whether the least significant bit ($x_{ccs,7}$) of the code offset indicator (COI) 220 is '0'. If the least significant bit ($x_{ccs,7}$) is '0', then at step 530, the user equipment 120 concludes that the modulation scheme used is 16-QAM. Alternatively, in one example, the user equipment 120 may be configured to conclude that the modulation scheme is 64-QAM when the least significant bit ($x_{ccs,7}$) is '0'.

Returning to step 525, when the least significant bit ($x_{ccs,7}$) is not '0', then at step 535, the user equipment 120 concludes that the modulation scheme used is 64-QAM. Alternatively, in one example, the user equipment 120 may be configured to conclude that the modulation scheme is 16-QAM when the least significant bit ($x_{ccs,7}$) is '1'.

After determining the modulation scheme used by the base station 115, the user equipment 120 proceeds to step 540 to calculate the original least significant bit ($x_{ccs,7}$) of the code offset indicator (COI) 220 based on the HS-SCCH number (I). In one example, the user equipment may calculate the original least significant bit ($x_{ccs,7}$) of the code offset indicator 220 using an unsigned binary representation of integers calculated by an expression according to $\lfloor x_{ccs,7}=\text{mod}(I,2) \rfloor$ to create a modified code offset indicator. Then the user equipment 120 decodes the code group indicator 215 received from the base station 115 and the modified code offset indicator, to get the number (P) and the offset (O) of the channelization codes as described in step 545. In one example, the user equipment 120 may use a look-up table 600 (see FIG. 6) to decode the channelization code set received from the base station 115 when the control channel (HS-SCCH) index (I) is even. Further, when the control channel index (HS-SCCH) index (I) is odd, the user equipment 120 may use a different look-up table 700 (see FIG. 7) to decode the channelization code set received from the base station 115. The schematic of the look-up tables 600, 700 are explained in detail below.

FIG. 6 is a schematic of a look-up table 600 representing channelization code set values for an even numbered control channel (HS-SCCH) index in accordance with some embodiments. The look-up table 600 may take the form of a matrix, wherein each row 605 of the matrix indicates an integer value (e.g., 0 through 7) of the code group indicator 215 and each column 610 of the matrix indicates an integer value (e.g., 0 through 15—representing 16 spreading codes) of the code offset indicator 220. Each row 605 of the matrix is further divided into two rows, where each top row 615 indicates the number of channelization codes (P) for the corresponding row 605 (code group indicator 215) and column 610 (code offset indicator 220), and each bottom row 620 indicates the code offset (O) for the corresponding row 605 (code group indicator 215) and column 610 (code offset indicator 220). In an example, when the code group indicator 215 is '4' and the code offset indicator 220 is '6', then the number of channelization codes (P) would be '5' and the code offset would be '7'. As shown in FIG. 6, only the even columns representing the even numbered code offset indicators (0, 2, 4, 6, 8, 10, 12, and 14) form a valid P and O combination for an even numbered control channel (HS-SCCH) index.

FIG. 7 is a schematic of a look-up table 700 representing channelization code set values for an odd numbered control channel (HS-SCCH) index in accordance with some embodiments. Note that the table entries in FIG. 7 are the same as the table entries in FIG. 6, but only odd columns are shaded as being valid. The look-up table 700 may take form of a matrix, wherein each row 705 of the matrix indicates an integer value (e.g., 0 through 7) of the code group indicator 215 and each column 710 of the matrix indicates an integer value (e.g., 0 through 15—representing 16spreading codes) of the code offset indicator 220. Each row 705 of the matrix is further divided into two rows, where each top row 715 indicates the number of channelization codes (P) for the corresponding row 705 (code group indicator 215) and column 710 (code offset indicator 220), and each bottom row 720 indicates the code offset (O) for the corresponding row 705 (code group indicator 215) and column 710 (code offset indicator 220). In an example, when the code group indicator 215 is '4' and the code offset indicator 220 is '5' then the number of channelization codes (P) would be '5' and the code offset (O) would be '6'. As shown in FIG. 7, only the odd columns representing the odd numbered code offset indicators (1, 3, 5, 7, 9, 11, 13, and 15) form a valid P and O combination for an odd HS-SCCH number.

The present invention, thus discloses an optimized set of channelization code set combinations that can be signaled when 64-QAM or other higher modulation schemes are introduced for downlink communication of the base station with the user equipment. Further, the implementations of the present invention on the base station and the user equipment ensure that the overall payload of the HS-SCCH is not increased, thereby reducing the complexity of the base station and the user equipment when 64-QAM or higher modulation schemes are introduced for downlink communication in HSDPA communication systems.

FIGS. 6 and 7 also permit an alternative view of the invention to be generated. Specifically, the common table underlying both FIG. 6 and FIG. 7 represents a table identifying a set of unique pairs (120 unique pairs), wherein each unique pair has a code offset (O) and number of channelization codes (P). The set of unique pairs is partitioned into at least a first subset (e.g., the even columns) containing at least one unique pair, and a second subset (e.g., the odd columns) containing at least another unique pair. As shown, the first subset and the second subset are disjoint. Further, the set of unique pairs is associated with a first modulation class (e.g., QPSK), while the first subset and the second subset are associated to a second modulation class (e.g., a combination of 16-QAM and 64-QAM). In one example, the second modulation class contains a first modulation type (e.g., 16-QAM) and a second modulation type (e.g., 64-QAM). In accordance with the present invention, when specifying the channelisation code set applicable to QPSK modulation, all of these unique pairs of the set are eligible for selection, regardless of the control channel index (I). When the modulation class is a combination of 16-QAM and 64-QAM, however, only a subset (either a first subset or a second subset) of the entire set of pairs of code offset (O) and number of channelization codes (P) is available for selection and signalling, where the applicable subset is determined by the control channel index (I) (or HS-SCCH number in this case). For example, an even-numbered control channel index (I) indicates the first subset, and an odd-numbered control channel index (I) indicates the second subset. Specifically, when the control channel (or HS-SCCH) number is even, the elements of the set with the shaded columns of the table 600 (FIG. 6) are eligible for selection; when the control channel (HS-SCCH) number is odd, the subset with the unshaded columns of table 600 are eligible for selection.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for a base station to signal a modulation scheme to a user equipment (UE) on a high speed shared control channel (HS-SCCH) in a high speed downlink packet access (HSPDA) communication system, the HS-SCCH carrying a modulation specifier ($x_{ms,1}$) comprising one bit information, a code group indicator ($x_{ccs,1}, x_{ccs,2}, x_{ccs,3}$) comprising three bit information, and a code offset indicator ($x_{ccs,4}, x_{ccs,5}, x_{ccs,6}, x_{ccs,7}$) comprising four bit information, the method comprising:

setting the modulation specifier ($x_{ms,1}$) to '0' if the modulation scheme is Quadrature Phase Shift Keying (QPSK);

setting the modulation specifier ($x_{ms,1}$) to '1' if the modulation scheme is other than QPSK;

determining a number of channelization codes (P), a code offset (O), and a control channel index (I), such that P, O and I fulfills a relation $|O-1-\lfloor P/8 \rfloor *15| \bmod 2 = (I) \bmod 2$;

encoding the number of channelization codes (P) on the code group indicator ($x_{ccs,1}, x_{ccs,2}, x_{ccs,3}$) using an unsigned binary representation of integers calculated by an expression according to $x_{ccs,1}, x_{ccs,2}, x_{ccs,3} = \min(P-1, 15-P)$, where $x_{ccs,1}$ is a most significant bit;

when the UE is not configured for 64-Quadrature Amplitude Modulation (64-QAM), or when the UE is configured for 64-QAM and the modulation specifier ($x_{m,1}$) is set to '0', encoding a code offset (O) on the code offset indicator ($x_{ccs,4}, x_{ccs,5}, x_{ccs,6}, x_{ccs,7}$) using an unsigned binary representation of integers calculated by an expression according to ($x_{ccs,4}, x_{ccs,5}, x_{ccs,6}, x_{ccs,7}) = |O-1-\lfloor P/8 \rfloor *15|$, where $x_{ccs,4}$ is a most significant bit and $x_{ccs,7}$ is a least significant bit;

when the UE is configured for 64-QAM and the modulation specifier ($x_{ms,1}$) is set to '1', encoding the code offset (O) on the code offset indicator ($x_{ccs,4}, x_{ccs,5}, x_{ccs,6}$) using an unsigned binary representation of integers calculated by an expression according to $x_{ccs,4}, x_{ccs,5}, x_{ccs,6}, x_{ccs,dummy} = |O-1-\lfloor P/8 \rfloor *15|$, where $X_{ccs,dummy}$ is a dummy bit that is not transmitted on the HS-SCCH, and encoding the least significant bit ($x_{ccs,7}$) of the code offset indicator based on the modulation scheme, wherein encoding the least significant bit comprises:

setting the least significant bit ($x_{ccs,7}$) of the code offset indicator to '0' when the modulation scheme is 16-quadrature amplitude modulation (16-QAM), and setting the least significant bit ($x_{ccs,7}$) of the code offset indicator to '1' when the modulation scheme is 64-QAM; and transmitting the modulation specifier ($x_{ms,1}$), the code group indicator ($x_{ccs,1}, x_{ccs,2}, x_{ccs,3}$), and the code offset indicator ($x_{ccs,4}, x_{ccs,5}, x_{ccs,6}, x_{ccs,7}$) on the HS-SCCH to the UE.

2. The method of claim 1, wherein the control channel index (I) is given by a position in a list of HS-SCCH channelization codes signaled by higher layers.

3. The method of claim 1, further comprising:
transmitting a message to the user equipment on a high speed downlink shared channel (HS-DSCH) using the modulation scheme, the number of channelization codes (P), and the code offset (O) as signaled on the HS-SCCH to the user equipment.

4. A method for a base station to signal a modulation scheme to a user equipment (UE) on a control channel in a communication system, the method comprising:

defining a set of unique pairs, wherein each unique pair has a code offset (O) and number of channelization codes (P);

partitioning the set into at least a first subset and a second subset, wherein the first subset contains at least one unique pair and the second subset contains at least another unique pair;

associating the set with a first modulation class, associating the first subset with a second modulation class, and associating the second subset with the second modulation class, wherein the second modulation class contains a first modulation type and a second modulation type; and signaling, by the base station to the UE, a modulation class and a pair associated with the modulation class and one of the first modulation type and the second modulation type.

5. The method of claim 4, wherein the signaling comprises: using a control channel index (I) to signal a subset.

6. The method of claim 5, wherein an even-numbered control channel index (I) indicates the first subset and an odd-numbered control channel index (I) indicates the second subset.

7. The method of claim 4, wherein the first subset and the second subset are disjoint.

8. The method of claim 4, wherein the first modulation class is Quadrature Phase Shift Keying (QPSK) and the second modulation class is a combination of 16-Quadrature Amplitude Modulation (16-QAM) and 64-Quadrature Amplitude Modulation (64-QAM).

9. The method of claim 4, wherein the first modulation type is 16-Quadrature Amplitude Modulation (16-QAM) and the second modulation type is 64- Quadrature Amplitude Modulation (64-QAM).

10. The method of claim 4, further comprising:
transmitting data to the user equipment using the modulation class, modulation type, and channelization codes identified by the pair.

11. A method for a user equipment to decode a signaled modulation scheme on a high speed shared control channel (HS-SCCH) in a high speed downlink packet access (HS- DPA) communication system, the HS-SCCH carrying a modulation specifier ($x_{ms,1}$) comprising one bit information, a code group indicator ($x_{ccs,1}$, $x_{ccs,2}$, $x_{ccs,3}$) comprising three bit information, and a code offset indicator ($x_{ccs,4}$, $x_{ccs,5}$, $x_{ccs,6}$, $x_{ccs,7}$) comprising four bit information, the method comprising:
receiving the modulation specifier ($x_{ms,1}$), the code group indicator($x_{ccs,1}$, $x_{ccs,2}$, $x_{ccs,3}$), and the code offset indicator ($x_{ccs,4}$, $x_{ccs,5}$, $x_{ccs,6}$, $x_{ccs,7}$) on the HS-SCCH from a base station;
examining the modulation specifier;
determining that the applied modulation scheme is quadrature phase shift keying (QPSK) if the modulation specifier is '0';
determining that the applied modulation scheme is other than QPSK if the modulation specifier is '1';
when the applied modulation scheme is determined to be QPSK,
  decoding a number of channelization codes (P) from the code group indicator and decoding a code offset (O) from the code offset indicator; and
when the applied modulation scheme is determined to be other than QPSK,
  examining the least significant bit ($x_{ccs,7}$) of the code offset indicator to determine whether the modulation scheme is 64-quadrature amplitude modulation (64-QAM), and
  when the determined modulation scheme is 64-QAM,
    generating a replacement least significant bit (LSB) of the code offset indicator based on a HS-SCCH number (I) using an unsigned binary representation of integers calculated by an expression according to $x_{ccs,7}=\mod(I,2)$ to create a modified code offset indicator, and
    determining the number of channelization codes (P) from the code group indicator and decoding the code offset (O) from the modified code offset indicator.

12. The method of claim 11, wherein the decoding the number of channelization codes (P) from the code group indicator and decoding the code offset (O) from the code offset indicator comprises:
using a pair of complementary look up tables containing all valid combinations of the number of channelization codes (P) and the code offset (O) for even numbered control channel indexes and odd numbered control channel indexes.

13. The method of claim 11, when the applied modulation scheme is determined to be other than QPSK, further comprising:
examining the least significant bit ($x_{ccs,7}$) of the code offset indicator to determine whether the modulation scheme is 16-quadrature amplitude modulation (16-QAM); and
when the determined modulation scheme is 16-QAM,
  generating the replacement least significant bit (LSB) of the code offset indicator based on the HS-SCCH number (I) using an unsigned binary representation of integers calculated by an expression according to $x_{ccs,7}=\mod(I,2)$ to create the modified code offset indicator, and
  decoding the number of channelization codes (P) from the code group indicator and decoding the code offset (O) from the modified code offset indicator.

14. A method for a user equipment to decode a signaled modulation scheme on a high speed shared control channel (HS-SCCH) in a high speed downlink packet access communication system, the HS-SCCH carrying a modulation specifier, a code group indicator, and a code offset indicator, the method comprising:
receiving the modulation specifier, the code group indicator, and the code offset indicator on the high speed shared control channel from a base station;
determining the modulation scheme applied by the base station using the modulation specifier; and
when the modulation scheme is determined to be other than quadrature phase shift keying (QPSK),
  examining a predetermined bit of the code offset indicator to determine that the applied modulation scheme is 64-quadrature amplitude modulation (64-QAM); and
when the modulation scheme is determined to be QPSK,
  decoding the code group indicator to obtain the number of channelization codes (P) and decoding the code offset indicator to obtain the code offset (O).

15. The method of claim 14, further comprising:
generating a replacement bit for the predetermined bit using a channel number (I).

16. The method of claim 15 wherein the generating comprises:
replacing the predetermined bit with an unsigned binary representation of integers calculated by an expression according to mod (I,2).

17. The method of claim 14, further comprising:
obtaining a number of channelization codes (P) from the code group indicator and obtaining a code offset (O) from the code offset indicator.

18. The method of claim 17, wherein the obtaining comprises:
using a pair of complementary look up tables containing all valid combinations of the number of channelization codes (P) and the code offset (O) for even and odd HS-SCCH channel numbers.

19. The method of claim 14, further comprising:
examining the predetermined bit of the code offset indicator to determine that the modulation scheme is 16-quadrature amplitude modulation (16-QAM).

* * * * *

UNITED STATES PATENT AND TRADEMARK OFFICE
CERTIFICATE OF CORRECTION

PATENT NO. : 9,203,663 B2  Page 1 of 1
APPLICATION NO. : 12/024159
DATED : December 1, 2015
INVENTOR(S) : Ken A. Stewart et al.

It is certified that error appears in the above-identified patent and that said Letters Patent is hereby corrected as shown below:

In the Claims:

Claim 1, Column 11, Line 52, please change "$X_{m,1}$" to -- $X_{ms,1}$ --

Claim 1, Column 11, Line 66, please change "$X_{ccs'dummy}$" to -- $X_{ccs,dummy}$ --

Signed and Sealed this
Twenty-third Day of February, 2016

Michelle K. Lee
*Director of the United States Patent and Trademark Office*